United States Patent [19]

Koo

[11] Patent Number: 5,047,859
[45] Date of Patent: Sep. 10, 1991

[54] METHOD AND APPARATUS FOR COMMUNICATION CHANNEL IDENTIFICATION AND SIGNAL RESTORATION

[75] Inventor: David Koo, Briarcliff Manor, N.Y.

[73] Assignee: North American Philips Corporation, New York, N.Y.

[21] Appl. No.: 595,112

[22] Filed: Oct. 9, 1990

[51] Int. Cl.$^5$ ............................................. H04N 7/08
[52] U.S. Cl. .................................... 358/187; 358/139; 358/167; 358/905; 375/13; 375/19; 455/65; 455/67
[58] Field of Search ............... 358/139, 905, 187, 167; 375/13, 15, 19; 455/65, 67

[56] References Cited

U.S. PATENT DOCUMENTS

| | | | |
|---|---|---|---|
| 4,864,403 | 9/1989 | Chao | 358/905 |
| 4,912,557 | 3/1990 | Faroudja | 358/905 |
| 4,953,026 | 8/1990 | Kobayashi | 358/905 |
| 4,980,767 | 12/1990 | Chao | 358/187 |

Primary Examiner—Howard W. Britton
Attorney, Agent, or Firm—Michael E. Marion

[57] ABSTRACT

A test signal is transmitted over a communication channel and the signal is received by a receiver. The temporal evolution of the test signal is represented in a matrix and the inverse of the test signal evolution matrix is stored in the receiver. Samples of the received signal and the test signal evolution matrix inverse are used to compute the channel impulse response, and the values of the channel impulse response set signal restoration filter coefficient values. The received signal is then restored by filtering.

14 Claims, 4 Drawing Sheets

METHOD AND APPARATUS FOR COMMUNICATION CHANNEL IDENTIFICATION AND SIGNAL RESTORATION

BACKGROUND OF THE INVENTION

The present invention relates to a method and apparatus for identifying the characteristics of a communication channel, and to a method and apparatus for restoring signals altered by the communication channel by using the channel characteristics information.

Communication engineering continually must deal with the problem of restoring a signal which has been altered by the communication channel over which the signal was transmitted. Signal restoration often can be achieved if the communication channel is fully characterized, at least as to those parameters which contribute to the signal alteration. Thus, a frequently essential component of the signal restoration problem is that of identifying the characteristics of the communication channel.

A straightforward approach to the channel identification problem is to transmit a known signal over the channel, and to receive the transmitted signal after it has passed through the channel. The originally transmitted signal is compared with the received signal, and a model of the channel characteristics is developed based on the comparison.

If channel identification is to be carried out in real time, or nearly in near real time, the computational burden can become enormous. In many practical applications hardware and cost constraints require considerable compromise as to the channel identification scheme that will be implemented, and may preclude anything approaching real-time channel identification.

One area where hardware and cost constraints on signal restoration impose substantial limitations is that of echo cancellation, and in particular, ghost cancellation in video signals. A good survey of the ghost cancellation problem can be found in W. Ciciora et al, A Tutorial On Ghost Cancelling In Television Systems, IEEE Trans. On Consumer Elec., Vol. CE-25, No. 1, pp 9–44 (Feb. 1979).

It is an object of the present invention to provide a method and apparatus for restoring a received signal that has undergone alteration after passing through a communication channel.

It is another object of the invention to provide a method and apparatus for identifying the characteristics of a communication channel.

It is another object of the invention to provide a method and apparatus for restoring a received signal to eliminate echoes or video ghosts, as well as other signal distortions which may be present.

It is another object of the invention to provide a method and apparatus for restoring a received signal which is simple and inexpensive, and which can be implemented with a minimum of computing hardware.

Another object of the invention is to provide a method and apparatus for restoring a received signal which can operate in substantially real time in a television receiver.

SUMMARY OF THE INVENTION

In the method according to the invention, no assumptions are made about the communication channel characteristics other than that the signal and channel interaction is described by linear system theory. Consequently, the channel is characterized completely by its impulse response.

A test signal is transmitted over the channel and the received test signal will be distorted or otherwise altered by the channel. The test signal and the received signal are related by the channel impulse response.

According to the invention, samples of the test signal are represented by an ensemble of sample sequences ordered in a matrix, called the test signal evolution matrix. The test signal evolution matrix changes from row to row in the manner that the test signal evolves in time. Samples of the received signal and the channel impulse response can be ordered in vectors. The channel impulse response sample vector can then be directly obtained through the multiplication of the inverse test signal evolution matrix and the received signal sample vector.

The sequence of channel impulse response function samples thus obtained serves to provide the correct coefficient values to a filter. The received signal is then fed into the filter, and the received signal is restored by filtering.

This method is general in nature, and is not derived from any particular model of signal distortion. In particular, it does not posit any particular model for echo generation such as the simple delay and attenuation model which is frequently assumed.

Because the test signal is known, the test signal evolution matrix and its inverse are known. At least some of the values of the inverse matrix elements are stored in the receiver, and the multiplication of the inverse test signal evolution matrix and the received signal vector is carried out at the receiver using relatively simple and inexpensive hardware.

When the method is applied to television reception, the test signal is contained in the vertical interval of the transmitted video signal. The received test signal is processed according to the invention and the channel characteristics thus obtained are used to set the coefficient values of a video filter circuit. The filter coefficient values are set during the vertical interval so that the channel information is continually updated during the course of signal reception.

DETAILED DESCRIPTION OF THE INVENTION

Channel Identification

Figure 1:
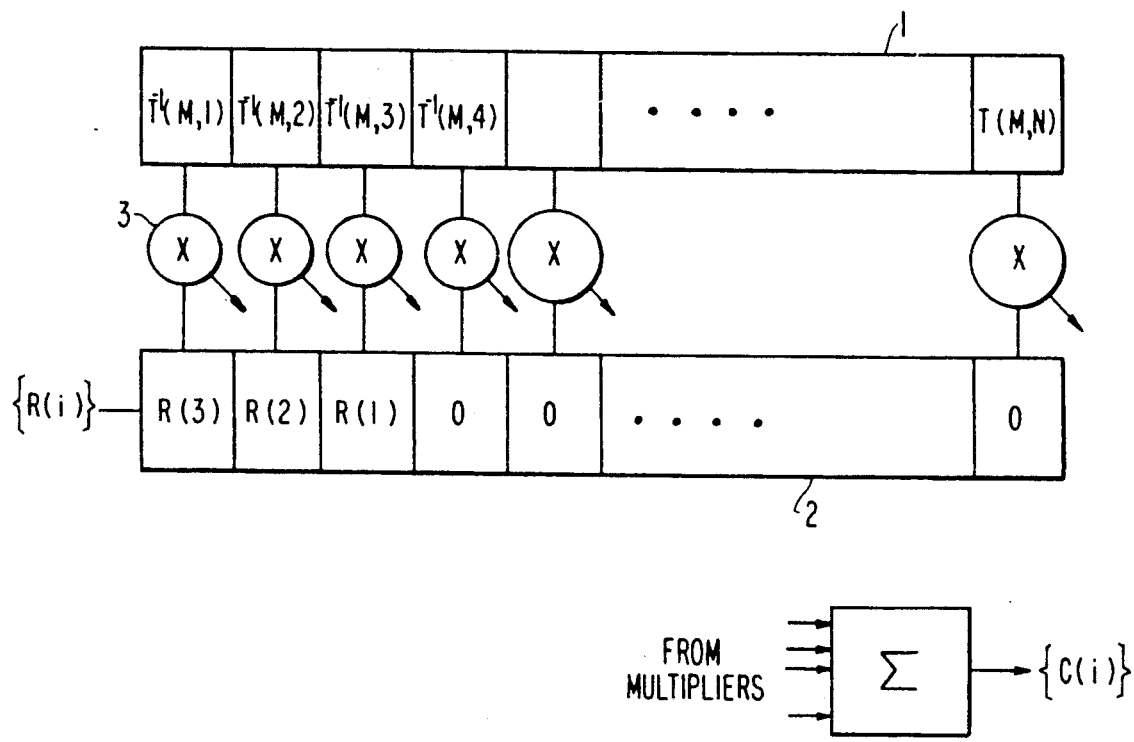
FIG. 1 is a schematic diagram of a circuit for computing values of a communication channel impulse response.

The process of channel identification is based on a linear model for the interaction of the channel and the transmitted signal so that the received signal is described by the convolution $$R(n) = \sum_{i=1}^{n} T(i) C(n - i + 1) \tag{1}$$

where {T(i)} is a sequence of samples of a transmitted signal T, {C(i)} is a sequence of samples of the channel impulse response C, and {R(i)} is a sequence of samples of a received signal R which is the transmitted signal after it has passed through the channel. Throughout this description the indices i, j, k, L, M, N, etc. are integers with lower case indicating a running index and upper case indicating a particular value.

Both of the sequences {T(i)} and {R(i)} are accessible to the television receiver if the signal T is known beforehand, e.g. if it is a predetermined test signal. The problem of channel identification then becomes one of calculating the sequence {C(i)} of channel impulse response samples from the sequences {T(i)} and {R(i)}.

The invention makes the calculation of the sequence {C(i)} by expanding the sequence {T(i)} into a test signal evolution matrix [T(m,i)] (or simply [T]) which embodies information about the temporal evolution of {T(i)}.

$$[T(m,i)] = \begin{bmatrix} T(1) & 0 & 0 & 0 & \ldots \\ T(2) & T(1) & 0 & 0 & \ldots \\ T(3) & T(2) & T(1) & 0 & \ldots \\ T(4) & T(3) & T(2) & T(1) & \ldots \\ \vdots & & & & \end{bmatrix}$$

Each row "m" of the matrix is a sub-sequence of {T(i)} starting with the initial sample T(1) and having "m" members of the sequence, with each subsequent row having the next sample of {T(i)} appended to the sub-sequence of the previous row. If the sequences {C(i)} and {R(i)} are represented by respective vectors C(i)] and R(i)], then the convolution equation (1) defining the received signal can be written as $$R(m)] = [T(m,i)]C(i)] \tag{2}$$

This equation can be solved directly for the channel impulse response samples by multiplying both sides by the inverse of [T(m,i)] which yields $$C(p)] = [T(p,q)]^{-1} R(q)] \tag{3}$$

The matrix [T(m,i)] is comprised of samples of the test signal T and thus it is known beforehand and wholly within the control of the system designer. Consequently, so is the inverse matrix $[T(p,q)]^{-1}$. The elements of $[T]^{-1}$ can be stored in the television receiver and the matrix multiplication carried out by successive convolutions as the sequence {R(i)} is being received, as follows:

$$C(1) = T^{-1}(1,1) R(1) + T^{-1}(1,2) R(2) + T^{-1}(1,3) R(3) \ldots$$

$$C(2) = T^{-1}(2,1) R(1) + T^{-1}(2,2) R(2) + T^{-1}(2,3) R(3) \ldots$$

$$C(p) = \sum_{q=1}^{Q} T^{-1}(p,q) R(q)$$

where $T^{-1}(p, q)$ = is the (p, q)th element of $[T(p, q)]^{-1}$.

Computation of the matrix equation 3 can be simplified by adding additional elements to appropriate rows of [T] to create a new matrix [T] which is a cyclic Toeplitz matrix whose elements on each diagonal are identical and whose rows and columns are cyclic. A property of the cyclic Toeplitz form is that the inverse matrix $[T]^{-1}$ is also a Toeplitz form. Thus, a single row of the matrix can generate every other element of the matrix simply by shifting the second (column) index of values of the matrix elements of a particular row. The symmetrical property of the Toeplitz form allows elements from a single row of the inverse matrix to be used to carry out all of the convolution summations represented by equation (3). The convolutions which generate the sequence {C(i)} can be carried out with the circuit shown in FIG. 1.

In FIG. 1, a register 1 stores the sequence $\{T^{-1} (M, j)\}$ where M denotes a particular row of the matrix $[T]^{-1}$ which contains N elements. The received signal sample sequence {R(i)} is stored in the shift register 2. The content of the respective cells of register 1 and shift register 2 are multiplied by the plurality of multipliers 3 and the products are added by adder 4. The output of the adder 4 is a value C(i) of the channel impulse response sample sequence. The entire sequence {C(i)} can be generated by storing the first received signal sample R(1) in the shift register 2 and calculating C(1); shifting R(1) by one cell in the shift register 2, storing R(2) and computing C(2); and so forth.

Figure 2:
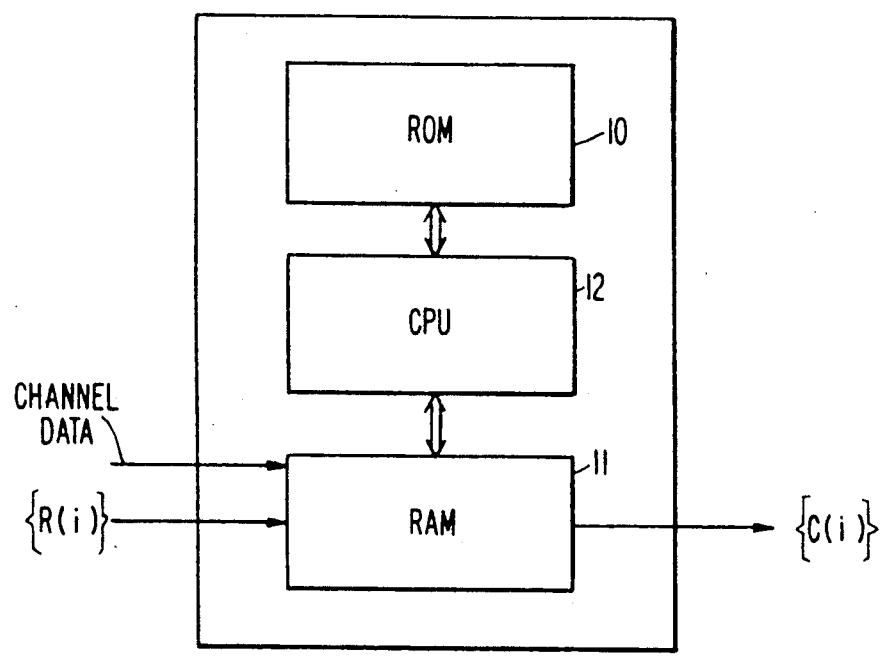
FIG. 2 is a schematic diagram of another circuit for computing values of a communication channel impulse response.

Another circuit for carrying out the calculations is illustrated in FIG. 2. The read-only memory (ROM) 10 stores the values $T^{-1}(p, q)$ and the program for evaluating equation (3). A random access memory (RAM) 11 is used for storing samples of the received signal R, intermediate results during the calculations, and the samples of the channel impulse response C. Central processor unit (CPU) 12 carries out the calculations under control of the program stored in ROM 10, and writes the results of the computation into the RAM 11. The CPU also controls the writing of the received signal samples into the RAM 11 and the reading of the channel impulse response values from the RAM 11.

In the event that the system will be used for signals transmitted over different channels, a channel indication signal is also stored in the RAM 11. Different channel impulse response values for the different channels are computed and stored, and are read out according to the channel being used.

Figure 3:
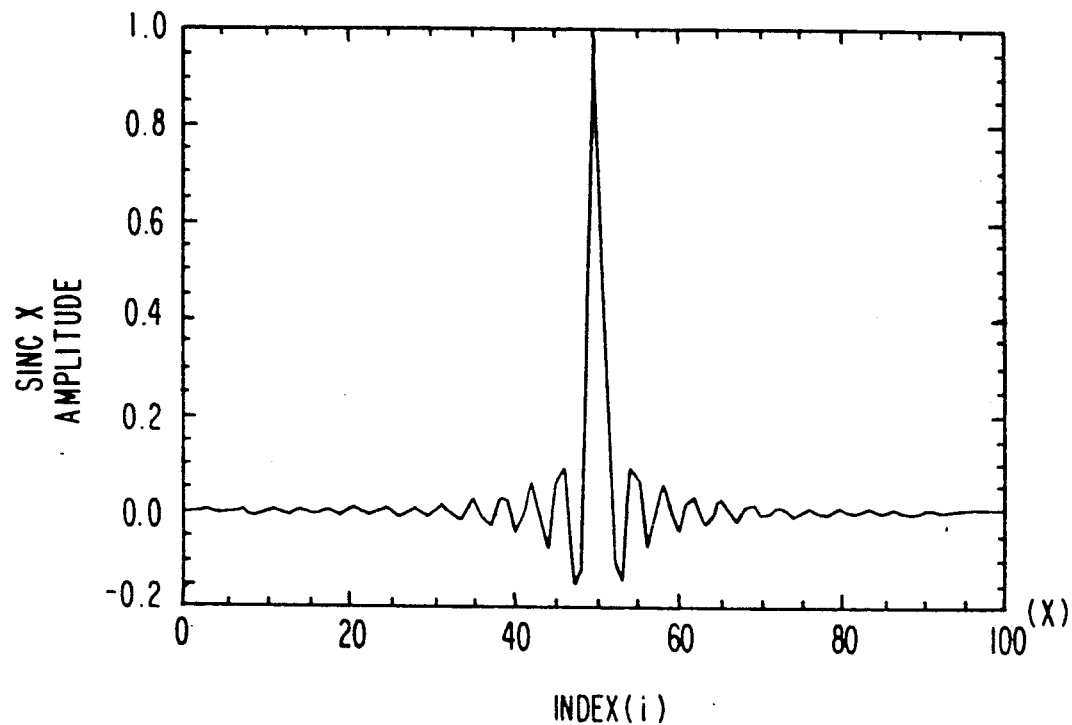
FIG. 3 is a graph of a test signal used in carrying out the invention.

The test signal T actually used in a computer implementation of the invention for video ghost cancellation was sinc x = (sin x)/x. This function is shown in FIG. 3. The sinc x function has the advantages of being well defined, containing adequate high frequency components to characterize the channel, and having sufficiently low values at its leading edge so that truncation errors are acceptable. Other test signals could be used as well.

The matrix [T] is in Toeplitz form which has the property that the values of the elements on any particular diagonal are equal. In other words, $a_{ij} = a_{i+n, j+n}$.

The computation of the inverse matrix $[T]^{-1}$ can be simplified, and the amount of required memory in the receiver can be substantially reduced, by modifying it to truncate its size and place it in a cyclic Toeplitz form. How this is done is shown in FIG. 4A.

Figures 4A, 4B:
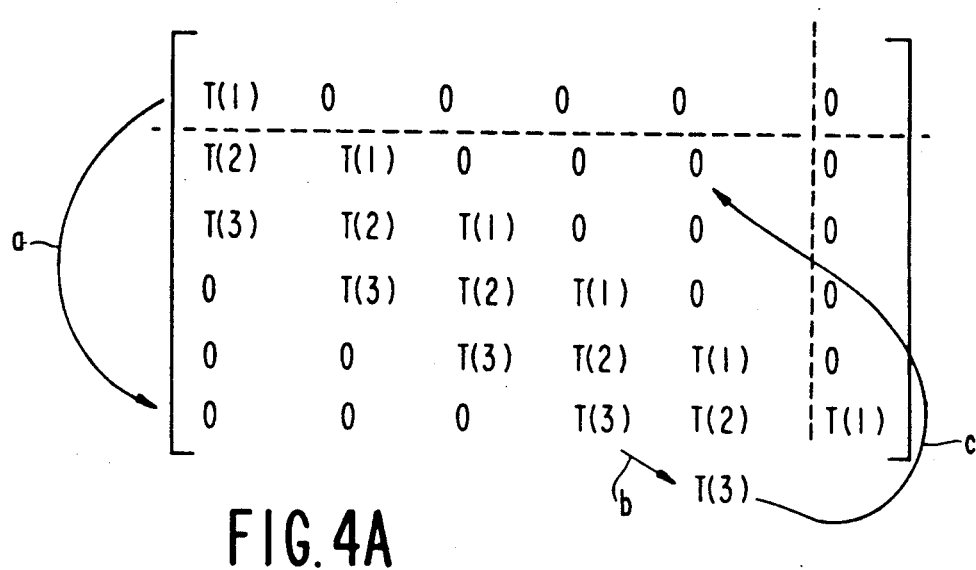
FIGS. 4A and 4B illustrate how the test signal evolution matrix is written in cyclic Toeplitz form.

In the example shown in FIG. 4A the sequence of {T(i)} has three members: {T(1), T(2), T(3)}. The test signal evolution matrix is a 6×6 matrix, and the received signal and channel vectors each have six elements. Assume in this example that T(2) has the largest value of the test signal samples. The matrix [T] is truncated so that the elements T(2) of each row lie on the main diagonal of the truncated matrix. The dashed lines in FIG. 4A indicate that the first row and the last column of the matrix [T] are deleted. This has the effect of eliminating the row and columns which are comprised of elements which are predominately zero. If the matrix [T] were to be inverted without deleting the row and column with predominately zero's and small valued elements, the resulting inverse matrix [T]$^{-1}$ would have element values extending over a great magnitude range and make subsequent calculations involving the inverse matrix very difficult.

The truncated matrix is put in cyclic form in the following manner. The element T(1) from the deleted row is placed in the first position of the last row, as shown by the arrow "a" in the drawing. Next, the element T(3) is "extended" diagonally to a position below the last column of the last row, as shown by the arrow "b", and then "reflected" to the first row as shown by arrow "c". The resulting matrix is Toeplitz, and it is also cyclic. Each column and each row of the matrix contains the test signal samples in cyclic order, i.e. if a column is traversed starting with the first test signal sample T(1), and if the traversal continues from the last element of the column to the first element of the column, then the test signal sample sequence will be traversed in order. The same holds true for each row. A cyclic Toeplitz matrix has the property that if it is invertible its inverse is also Toeplitz. In the rest of this description the matrix [T] will denote the test signal evolution matrix in cyclic Toeplitz form.

The cyclic Toeplitz matrix derived from [T] as described above will in practice not always be invertible because the rank of the matrix [T] can be less than the dimension of the matrix. This occurs in television systems, for example, because the sampling frequency is substantially higher than the maximum video signal frequency, i.e. the video signal is oversampled. The NTSC picture signal has a color subcarrier of approximately 3.58 MHz which is sampled at approximately 14.3 MHz or four times the subcarrier frequency and twice the Nyquist sampling rate. This is done to allow the use of inexpensive filters while still avoiding aliasing of the sampled signal.

If the cyclic Toeplitz matrix [T] is subjected to an eigenvalue decomposition the resulting matrix [λ] will be diagonal with the diagonal elements being the eigenvalues of the linear transformation represented by the matrix [T]. Some of the diagonal elements of [λ] will be zero which is a consequence of the rank being less than the dimension of the matrix. If the matrix [T] is considered a linear transformation on some vector space, then the non-zero eigenvalues correspond to a sub-space (called the rank space), and the zero-valued eigenvalues correspond to another sub-space (called the null space). A property of these sub-spaces important to this invention is that they are disjoint; there is no orthogonal projection from one onto the other. Consequently, [T] will not be invertible. The mathematical details can be found in most texts on linear algebra, for example: Linear Algebra by Paul Shields, (Addison-Wesley 1964).

In order to guarantee the invertibility of the matrix [T] and to limit the range of magnitudes of the inverse matrix elements, the applicant has discovered the following approximation technique.

The test signal evolution matrix [T] is transformed by an eigenvalue decomposition transformation to obtain a matrix [λ] of the eigenvalues of [T] as follows:

$$[E][T][E]^{-1} = [\lambda]$$

where [E] is the eigenvalue transformation and [λ] is the matrix of eigenvalues $$[\lambda] = \begin{bmatrix} \lambda_1 & 0 & 0 & 0 & \cdots \\ 0 & \lambda_2 & 0 & 0 & \cdots \\ 0 & 0 & \lambda_3 & 0 & \cdots \\ \vdots & & & & \\ 0 & 0 & 0 & 0 & \lambda_n \end{bmatrix}$$

In general, the eigenvalues $\lambda_1$ to $\lambda_r$ will be non-zero, and the eigenvalues $\lambda_{r+1}$ to $\lambda_n$ will be zero. The value of r, the number of non-zero eigenvalues, is called the rank of the matrix [T]. In order for a matrix to be invertible its rank must equal its dimension. This can be achieved by adding to [λ] an augmenting matrix [A] which has non-zero values at the position of zero-valued eigenvalues of [λ] such that $$[\lambda_A] = [\lambda] + [A] =$$

$$\begin{bmatrix} \lambda_1 & 0 & 0 & 0 & & \\ 0 & \lambda_2 & 0 & 0 & & \\ \cdots & & \lambda_r & & & \\ & & & a_1 & & \\ \vdots & & & & \ddots & \\ 0 & 0 & 0 & 0 & & a_{n-r} \end{bmatrix}$$

The inverse of the eigenvalue decomposition transformation [E] is then applied to [A] as follows $$[W] = [E]^{-1}[A][E]$$

This new matrix [W] has the property that every column of [W] is uncorrelated with every column of [T]. An arbitrary one of the columns of [W] is then selected and added to the test signal sample sequence {T(i)} to form a new test signal sample sequence {T*(i)}. This new sequence {T*} is used to form a new test signal evolution matrix [T*] which is always invertible because it contains the non-zero eigenvalues of the augmentation matrix [A]. Additionally, when the matrix [T*] is inverted and used to solve the equation $$C] = [T^*]^{-1}R]  \qquad (4)$$

the uncorrelated components from W] will tend to average out and the values obtained for C] will be significantly accurate for subsequent use in signal processing.

The approximation technique allows the selection of a test signal and sampling rate without regard to the invertibility of the matrix [T]. The matrix [T*] is then formed which is guaranteed to be invertible. In addition the eigenvalues of the augmentation matrix [A] are arbitrary which allows them to be selected to influence the element values of $[T^*]^{-1}$. Thus, [A] is experimentally selected to arrive at a matrix $[T^*]^{-1}$ having values which are not too large to allow the computation of equation (4) to be carried out with simple hardware such as an eight-bit microprocessor.

Writing the matrix [T] in cyclic Toeplitz form is an approximation which introduces inaccuracies into the computed values of the beginning and ending elements of C]. By computing a large enough number of channel samples values, only a small part of the channel vector at the beginning and ending elements will contain inaccuracies but the remaining set of channel samples can be used effectively for filtering.

The various matrix calculations such as multiplication, inversion and eigenvalue decomposition can be carried out using standard software library routines. An important aspect of the invention is that these calculations are part of the system design, and the only real-time calculations are expressed in equations (3) or (4).

Echo Cancellation

An input video signal which has passed through a particular channel is applied to a signal restoration filter. The channel impulse response sample sequence $\{C(i)\}$ for the particular channel serves to determine the restoration filter coefficients. The input signal is filtered and the resulting output has channel-induced distortion diminished or removed completely. In order to compensate for variations in the channel impulse response which occur over time, the channel impulse response sample sequence $\{C(i)\}$ can be repeatedly recomputed and the channel coefficients updated. Additionally, as mentioned in connection with the description of the circuit shown in FIG. 2, signals which have passed through different channels can be restored using the same filter by passing an appropriate set of channel impulse response samples to the filter.

Figure 5:
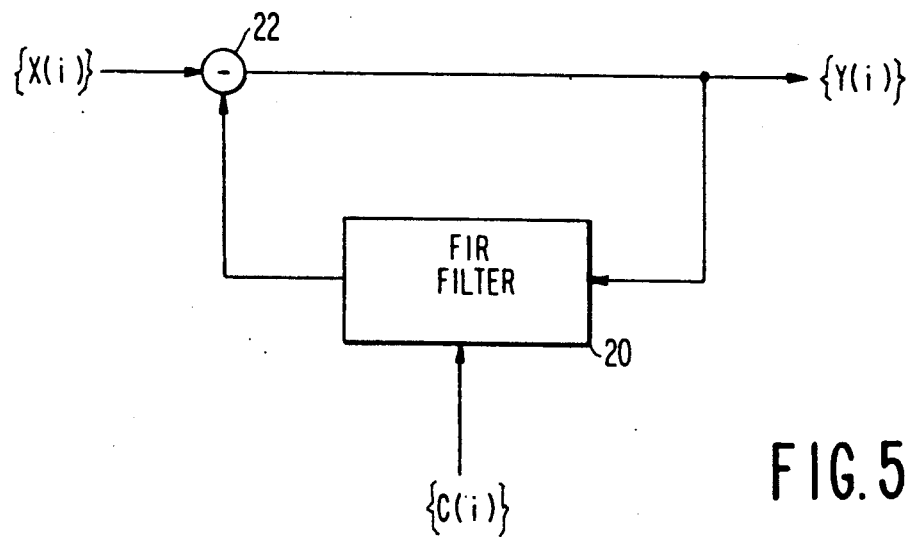
FIG. 5 is a block diagram of a filtering arrangement for use in carrying out the invention.

FIG. 5 illustrates a general scheme for the filter configuration. A finite impulse response filter 20 receives the sequence $\{C(i)\}$ of channel impulse response samples from either of the circuits shown in FIGS. 1 and 2, and the filter coefficient values are set. The architecture of the filter 20 is arbitrary and the system designer may select among the numerous available designs based on the usual engineering trade-offs.

The received signal sample sequence $\{X(i)\}$ is applied to the input of a subtracter 22 as is the output of the filter 20. Here, the input signal X is any received signal and not just the test signal T. The output of the subtracter 22 is a sequence $\{Y(i)\}$ of samples of the restored transmitted signal Y with the effects of the channel removed from the received signal X.

As discussed above, the method and circuits according to the invention are completely general and rely on no prior assumptions regarding the channel characteristics, channel noise, the test signal and similar considerations. It exhibits high noise immunity and it is easy to implement. Accordingly, the particular circuits shown are exemplary, and the scope of the invention is defined by the following claims.

I claim:

1. A method of communication channel identification, comprising:
   transmitting a test signal T over a communication channel to be identified;
   receiving a signal R which is the test signal T after it has passed through the communication channel; and
   calculating a sequence of channel values $$\left\{ C(p) = \sum_{q=1}^{Q} T^{-1}(p,q) R(q) \right\}$$

where $T^{-1}(p, q)$ is the (p, q)th element of the inverse of the test signal evolution matrix $$[T(m,i)] = \begin{bmatrix} T(1) & 0 & 0 & 0 & \ldots \\ T(2) & T(1) & 0 & 0 & \ldots \\ T(3) & T(2) & T(1) & 0 & \ldots \\ T(4) & T(3) & T(2) & T(1) & \ldots \\ \vdots & & & & \\ \vdots & & & & \end{bmatrix}$$

$\{T(i)\}$ is a sequence of values of the transmitted test signal and $\{R(i)\}$ is a sequence of values of the received test signal.

2. A method of communication channel identification according to claim 1, further comprising:
   writing the matrix [T] in cyclic Toeplitz form and inverting the matrix [T] to form an inverse matrix $[T]^{-1}$ which is also in Toeplitz form;
   calculating the sequence $\{C(p)\}$ of channel values using the inverse matrix $[T]^{-1}$ in Toeplitz form; and
   discarding at least some of those elements of $\{C(m)\}$ that have errors resulting from the use of the inverse matrix $[T]^{-1}$ in Toeplitz form.

3. A method of communication channel identification according to claim 1, wherein
   the communication channel is a video channel, and the test signal T is a video test signal.

4. A method of communication channel identification according to claim 1, further comprising:
   adding an uncorrelated component to the matrix [T] to form a new matrix $[T^*]$;
   selecting the uncorrelated component to insure the invertibility of $[T^*]$; and
   calculating $\{C(p)\}$ using $[T^*]^{-1}$.

5. A method of communication channel identification according to claim 4, further comprising:
   deleting a number of the upper rows of $[T^*]$ and deleting an equal number of the right most columns of $[T^*]$ before calculating the inverse matrix $[T^*]^{-1}$.

6. A method of removing channel-induced distortion from signals, comprising:
   transmitting a test signal T over a communication channel;
   receiving a signal R which is the test signal T after it has passed through and been distorted by the communication channel;
   calculating a sequence of channel values $$\left\{ C(p) = \sum_{q=1}^{Q} T^{-1}(p,q) R(q) \right\}$$

where $T^{-1}(p, q)$ is the (p, q)th element of the inverse of the test signal evolution matrix $$[T(m,i)] = \begin{bmatrix} T(1) & 0 & 0 & 0 & \ldots \\ T(2) & T(1) & 0 & 0 & \ldots \\ T(3) & T(2) & T(1) & 0 & \ldots \\ T(4) & T(3) & T(2) & T(1) & \ldots \\ \vdots & & & & \end{bmatrix}$$

{T(i)} is a sequence of values of the transmitted test signal and {R(i)} is a sequence of values of the received test signal; and filtering signals transmitted over the channel with a filter having filter coefficients determined from the sequence {C(p)} of calculated channel values.

7. A method of removing channel-induced distortion from signals according to claim 6, further comprising:
writing the matrix [T] in cyclic Toeplitz form and inverting the matrix [T] to form an inverse matrix $[T]^{-1}$ which is also in Toeplitz form;
calculating the sequence {C(p)} of channel values using the inverse matrix $[T]^{-1}$ in Toeplitz form; and
discarding at least some of those elements of {C(m)} that have errors resulting from the use of the inverse matrix $[T]^{-1}$ in Toeplitz form.

8. A method of removing channel-induced distortion from signals according to claim 6, wherein
the communication channel is a video channel, and the test signal T is a video test signal.

9. A method of removing channel-induced distortion from signals according to claim 6, further comprising:
adding an uncorrelated component to the matrix [T] to form a new matrix [T*];
selecting the uncorrelated component to insure the invertibility of [T*]; and
calculating {C(p)} using $[T^*]^{-1}$.

10. A method of removing channel-induced distortion from signals according to claim 9, further comprising:
deleting a number of the upper rows of [T*] and deleting an equal number of the right most columns of [T*] before calculating the inverse matrix $[T^*]^{-1}$.

11. An apparatus for communication channel identification, comprising:
means for storing the inverse of the evolution matrix of a predetermined test signal; and
calculating means for calculating the convolution of the inverse test signal evolution matrix and the received predetermined test signal to obtain calculated values of samples of a communication channel impulse response.

12. An apparatus for communication channel identification according to claim 11, wherein
said means for storing and said calculating means are in a receiver and are effective for calculating values of samples of the channel impulse response in real time.

13. In a receiver, the combination of:
means for storing the inverse of the evolution matrix of a predetermined test signal;
calculating means for calculating the convolution of the inverse test signal evolution matrix and the received predetermined test signal to obtain calculated values of samples of the channel impulse response in real time; and
filtering means receptive of the calculated channel impulse response samples for filtering received signals in real time to diminish the effects of the channel upon the signal.

14. In a receiver according to claim 13, wherein
said means for storing is effective for storing the calculated channel impulse response samples for more than one channel; and
said calculating means is effective to calculate channel impulse response samples to permit multi-channel signal restoration.

* * * * *